(12) United States Patent
Kettley et al.

(10) Patent No.: US 8,347,278 B2
(45) Date of Patent: Jan. 1, 2013

(54) INSTRUMENTING A COMPILED SOFTWARE ROUTINE FOR AUGMENTATION

(75) Inventors: Paul Kettley, Winchester (GB); Ian J. Mitchell, Hants (GB); Stephen J. Wood, Hants (GB)

(73) Assignee: International Business Machines Corporation, Armonk, NY (US)

(*) Notice: Subject to any disclaimer, the term of this patent is extended or adjusted under 35 U.S.C. 154(b) by 1141 days.

(21) Appl. No.: 12/211,971

(22) Filed: Sep. 17, 2008

(65) Prior Publication Data

US 2009/0119653 A1    May 7, 2009

(30) Foreign Application Priority Data

Nov. 2, 2007    (EP) .................................... 07119901

(51) Int. Cl.
     *G06F 9/45*      (2006.01)
     *G06F 3/00*      (2006.01)

(52) U.S. Cl. ......................... 717/151; 717/140; 719/331

(58) Field of Classification Search .......... 717/124–139, 717/140–161; 719/331–332
See application file for complete search history.

(56) References Cited

U.S. PATENT DOCUMENTS

| | | | | |
|---|---|---|---|---|
| 5,175,828 A | * | 12/1992 | Hall et al. ..................... | 719/331 |
| 5,450,586 A | * | 9/1995 | Kuzara et al. ................. | 717/124 |
| 5,579,520 A | * | 11/1996 | Bennett ........................ | 717/151 |
| 5,903,758 A | * | 5/1999 | Walker ......................... | 717/130 |
| 6,223,341 B1 | * | 4/2001 | Bittner et al. ................. | 717/154 |
| 6,467,086 B1 | | 10/2002 | Kiczales et al. | |
| 6,654,953 B1 | * | 11/2003 | Beaumont et al. ............ | 717/158 |
| 6,948,164 B2 | * | 9/2005 | Tinker .......................... | 717/168 |
| 8,127,276 B2 | * | 2/2012 | Chen et al. ................... | 717/127 |
| 2009/0119636 A1 | * | 5/2009 | Kettley et al. ................ | 717/100 |
| 2009/0119653 A1 | * | 5/2009 | Kettley et al. ................ | 717/151 |

\* cited by examiner

*Primary Examiner* — Christopher B Shin (74) *Attorney, Agent, or Firm* — Jean M. Sullivan; Hoffman Warnick LLC

(57) ABSTRACT

A method for augmenting a compiled software routine in execution, the compiled software routine being instrumented to generate an event at an augmentation point defined therein, the method including receiving the event at a second software routine, the second software routine including software instructions for augmenting the compiled software routine.

6 Claims, 8 Drawing Sheets

INSTRUMENTING A COMPILED SOFTWARE ROUTINE FOR AUGMENTATION

FIELD OF THE INVENTION

The present invention relates to instrumenting compiled software routines. In particular, it relates to instrumenting compiled software routines for augmentation.

BACKGROUND OF THE INVENTION

In enterprise systems including legacy software, such as aging software, there is a reluctance to change the legacy software due to a risk that the software may operate unpredictably or inefficiently. The extent of this problem can increase with the age of legacy software and the level of documentation, support, and developer experience recedes. However, it is often necessary for the operation of such legacy software to be adapted, supplemented, or otherwise affected in order to provide facilities and services required of modern data processing systems. It would be most advantageous if such changes to legacy software did not necessitate the rewriting or replacement of the software where the software is otherwise considered to be reliable and effective.

In the prior art, aspect oriented programming (AOP) techniques are employed to weave aspects of code into predefined join-points within a software application. The use of aspect oriented programming techniques is not effective in addressing the aforementioned problem for at least two reasons. Firstly, applications for which aspect oriented programming approaches are applied must be developed with aspect oriented programming in mind and must therefore be architected accordingly so as to be parsed by an aspect weaver. Legacy software may exist in only its compiled form, such as a machine code executable form, and is not necessarily developed in an aspect oriented programming language (such as have been available only relatively recently, and as are discussed in U.S. Pat. No. 6,467,086 Assigned to Xerox Corporation). Secondly, in order to strictly define points in a legacy application for the purpose of aspect weaving, it would be necessary to be able to uniquely identify such points by way of satisfying an aspect rule. In any event, to employ technology such as aspect oriented programming for legacy systems it will be necessary to provide aspect support for legacy programming languages (including Cobol, PL/1, Fortran, and assembly languages) and a recompilation of the legacy system will be required to weave newly developed aspect code for inclusion into resulting executable binaries. Such a development would involve substantial effort possibly correlating to the effort required to replace a legacy system.

Another technology available in the prior art involves executing software routines in a special mode known as "debug mode". Debug mode provides for the setting of breakpoints and effecting changes to an application state interactively by a software developer during software development. Such debug technologies require that applications include debug code (such as data definitions and references to source code) that result in a larger runtime executable and poor runtime performance. Consequently, debug code is normally not included in production runtime binaries since these require high performance and are not intended to be run with an interactive debugger. Furthermore, a decision to include debug code into a software routine is made at build-time, and legacy software available only in its compiled runtime production form cannot necessarily be rebuilt (i.e., recompiled, linked and packaged). Yet further, the function of such a debug mode is specifically directed to providing problem determination and resolution facilities at development time, and involves interactive use of debugger software by a software developer. It is unlikely to be acceptable to involve a software developer interactively in supplementing a legacy software routine at production runtime.

It would therefore be advantageous to provide for the augmentation of compiled legacy software without rewriting or replacement of the software where the software is otherwise considered to be reliable and effective.

SUMMARY OF THE INVENTION

The present invention accordingly provides, in a first aspect a method for augmenting a compiled software routine in execution, the compiled software routine being instrumented to generate an event at an augmentation point defined therein, the method including receiving the event at a second software routine, the second software routine including software instructions for augmenting the compiled software routine.

In this way, a legacy software routine in its compiled form that is instrumented to generate an event for augmentation can be augmented by a second software routine. The second software routine includes instructions for augmenting the compiled software routine, such as instructions for providing additional functionality, procedures, subroutines, data manipulations, or enhancements. The augmentation can be achieved without rewriting or replacing the compiled software routine.

The present invention accordingly provides, in a second aspect, an apparatus for augmenting a compiled software routine in execution, the compiled software routine being instrumented to generate an event at an augmentation point defined therein, the apparatus including means for receiving the event at a second software routine, the second software routine including software instructions for augmenting the compiled software routine.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer readable medium comprising computer program code to, when loaded into a computer system and executed thereon, cause the computer to perform the steps of a method as described above.

BRIEF DESCRIPTION OF THE DRAWINGS

An embodiment of the present invention is described below in more detail, by way of example only, with reference to the accompanying drawings.

DETAILED DESCRIPTION OF THE INVENTION

Figure 1:
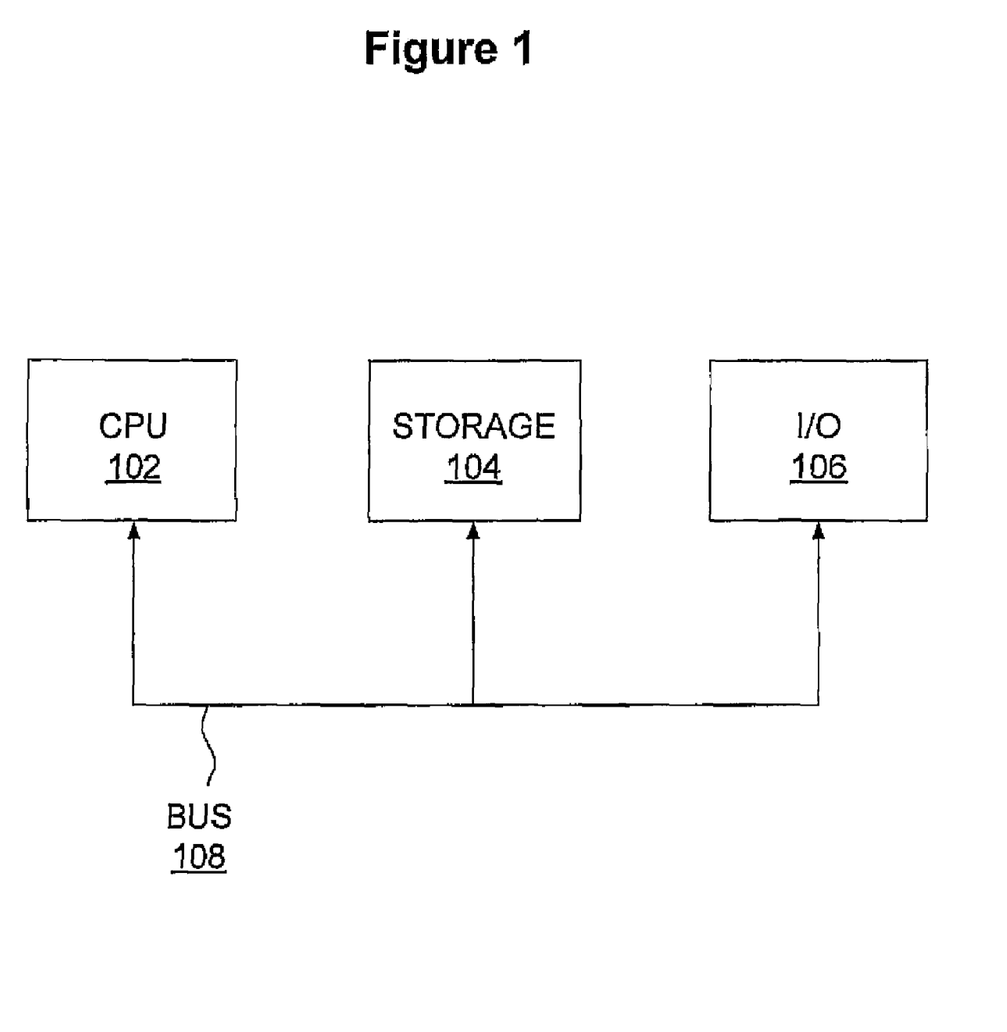
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
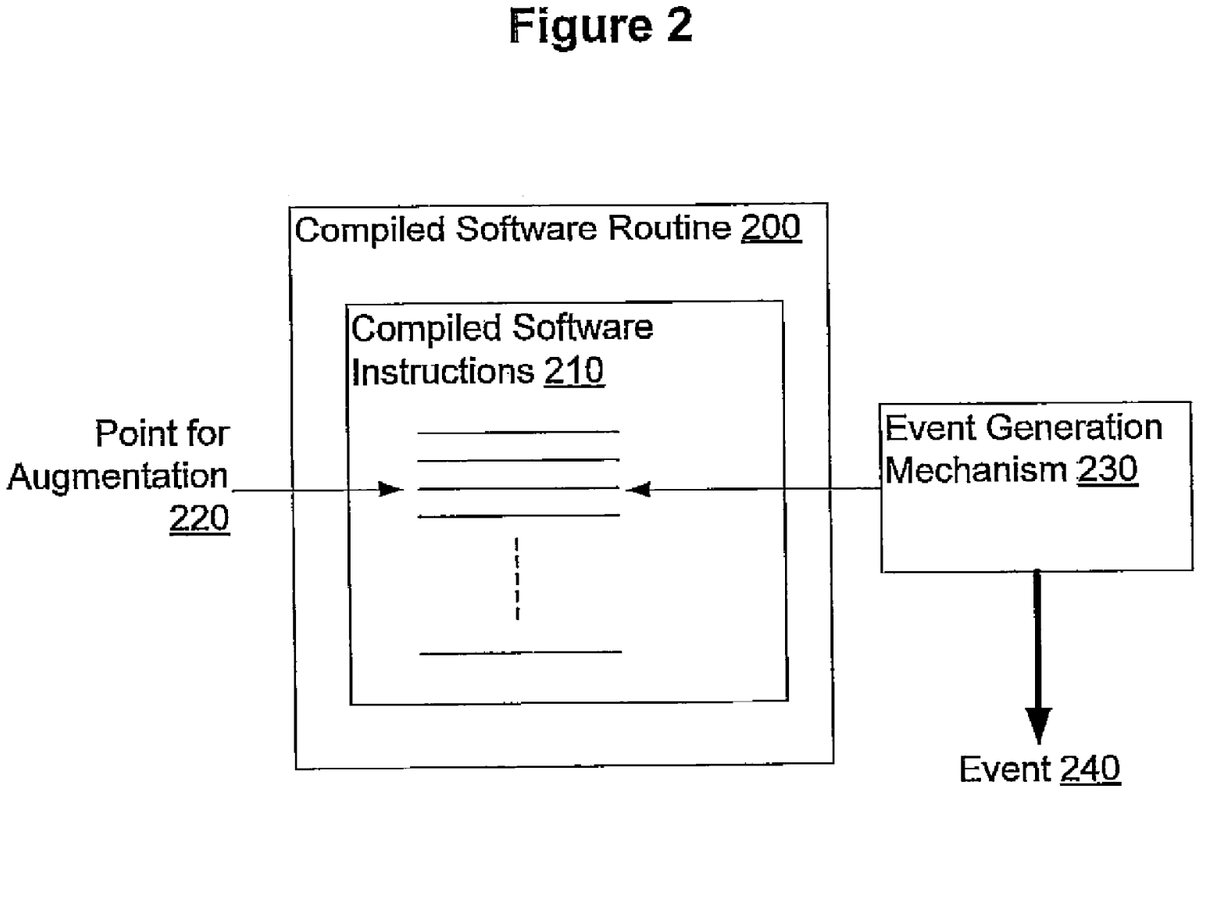
FIG. 2 is a schematic diagram of a compiled software routine for instrumentation in accordance with a preferred embodiment of the present invention.

FIG. 2 is a schematic diagram of a compiled software routine 200 for instrumentation in accordance with an embodiment of the present invention. Software routine 200 is a software module or component such as a computer program in a compiled form. For example, software routine 200 is a legacy software routine in a binary executable form, or a software routine having been previously compiled to machine code or assembly language. The software routine 200 comprises compiled software instructions 210 illustrated generally in FIG. 2. Such instructions can be in machine code or assembly language suitable for interpretation by a microprocessor or the like. The compiled software routine 200 and software instructions 210 can be the product of a software compiler (such as a programming language compiler). Alternatively, the software routine 200 and the software instructions 210 are all or partly compiled manually, having been provided directly by a software developer as has been known to be common in historical software development and also in contemporary software development, such as to achieve high performance.

FIG. 2 illustrates how a single one of the software instructions 210 is selected as a point for augmentation 220. The selected software instruction at the point for augmentation 220 corresponds to a location in the software instructions 210 at which augmentation of the software routine 200 is required. Augmentation can include providing further software instructions for providing additional functionality, procedures, subroutines, data manipulations, or enhancements. For example, there may be a requirement to supplement the functionality of the software routine 200 with further logic (by way of further software instructions). The point for augmentation 220 indicates where such further functionality is required. The point for augmentation 220 can be any reference in the compiled software instructions 210 suitable for identifying the instruction at which augmentation is required. For example, the point for augmentation 220 can be an address of a software instruction, or an offset from a base software instruction in the software routine 200.

The point for augmentation 220 can be selected by a software developer on the basis of a requirement for augmenting the software routine 200. Conceivably the point for augmentation 220 may be identified by an automated procedure searching for aspects of the compiled software instructions 210 that satisfy certain predetermined criteria. For example, in the event of a requirement to augment the software routine 200 to enact a change in a format for certain data items (such as a 'date' format or a COBOL picture clause), software instructions 210 involved in the use of the existing data format can be identified and augmentation points defined corresponding to their location in the software routine 200.

FIG. 2 further includes an event generation mechanism 230. The event generation mechanism 230 is a software or hardware component operable to supplement the selected software instruction at the point for augmentation 220 so that, in execution, an event 240 is generated at the selected instruction. The event 240 can be generated before or after the selected instruction, as is desired by any particular implementation of an embodiment of the present invention. The event generation mechanism 230 is any mechanism suitable for generating the event 240 at the point for augmentation 220.

In one embodiment, the event generation mechanism 230 involves introducing an intermediate software instruction within the software instructions 210 that is operable to generate an event 240. The introduction of such an intermediate software instruction might involve shifting software instructions 210 to accommodate a new software instruction. Further, such an intermediate software instruction may be a single instruction, such as a single event generating instruction or a branch instruction to a subroutine operable to generate the event 240. Alternatively, such an intermediate software instruction may be a set of multiple instructions operable to generate the event 240.

In an alternative embodiment, the event generation mechanism 230 includes a software monitor operable to examine the state of execution of the software instructions 210 and being adapted to identify when, during the execution of the software routine 200, the selected instruction at the point for augmentation 220 is executed. In response to this identification, the event 240 can be generated by the software monitor. For example, such a software monitor can be a hardware or software routine to which the execution state of the compiled software routine 200 is accessible.

In a yet further alternative embodiment, the event generation mechanism 230 employs a software "trap", such as is exemplified by microprocessors of the kind deriving from the x86 architecture of microprocessors, in which a dedicated processor register, flag, or bit is provided to indicate when the processor should enter a software trap. A software trap is a special mode of execution in which execution can be intercepted. For example, the 8088 (and subsequent) microprocessor from Intel Corporation includes a trap flag register for, when set, causing the processor to enter a "single-step" mode in which an interrupt numbered 0x1 H is issued after the execution of every software instruction. Thus an event generation mechanism 230, being a software or hardware component operable to set a trap flag at the point for augmentation 220, can operate responsively to the issuance of interrupt 0x1 H in order to cause the generation of the event 240. For example, such an event generation mechanism 230 can insert a machine code instruction immediately before (or immediately after) the software instruction at the point for augmentation to set the trap flag.

The event 240 is any mechanism suitable for consumption or receipt by, or communication to, other software routines in execution for providing augmenting software instructions.

Such other software routines are thus operable to undertake the actual augmentation of the compiled software routine 200, such as by providing further software instructions for providing additional functionality, procedures, subroutines, data manipulations or enhancements. For example, the event 240 is a software event such as a data message suitable for transmission between software routines. Alternatively, event 240 is a function call, a method call, a branch to a subroutine, a jump to a predetermined set of software instructions, an interrupt, a software or hardware exception, or a network message. In some embodiments the event 240 is communicable via a network, such as where an augmenting software routine is provided at a different computer system.

Figure 3:
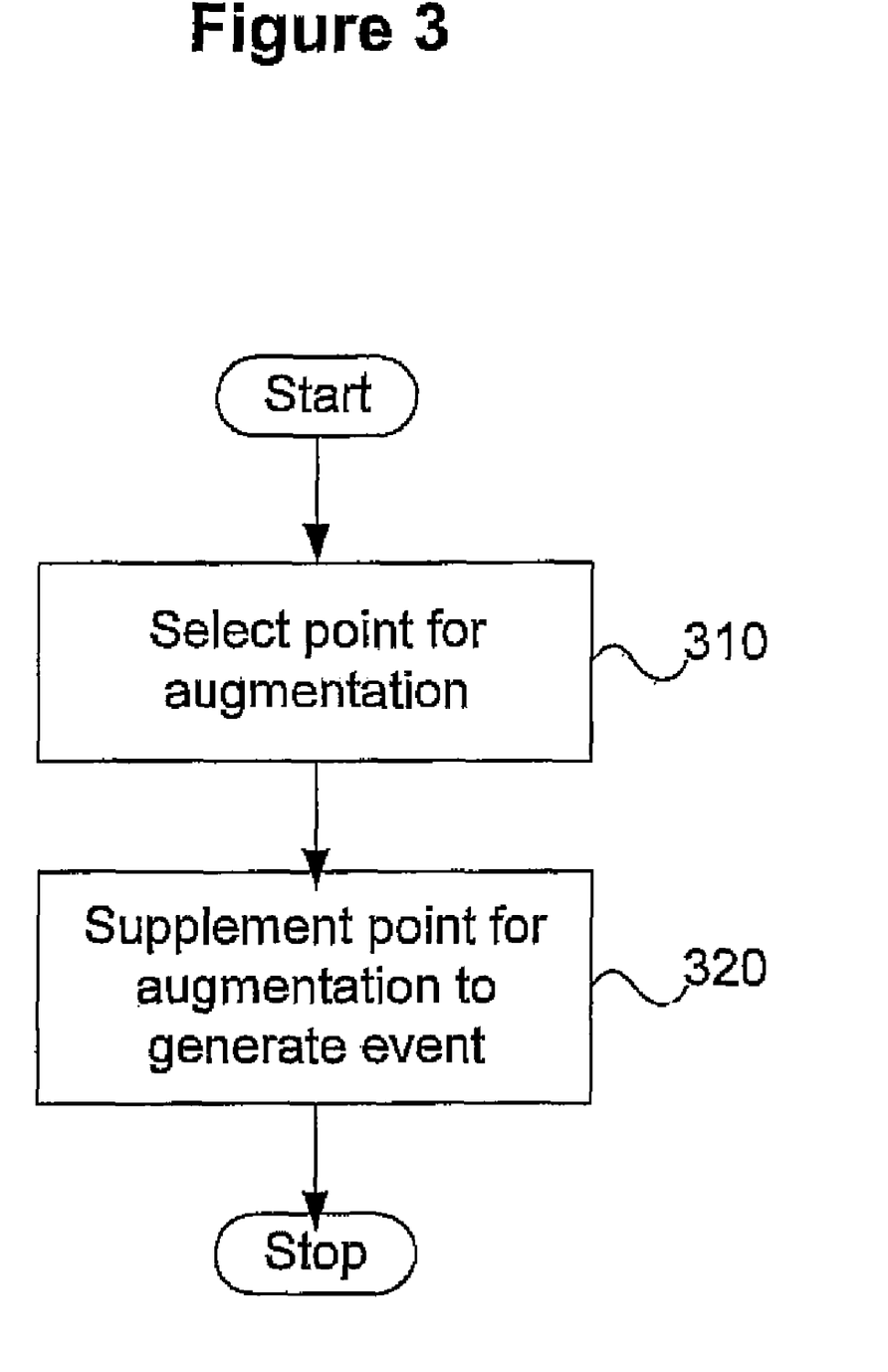
FIG. 3 is a flowchart of a method for instrumenting the compiled software routine in accordance with a preferred embodiment of the present invention.

FIG. 3 is a flowchart of a method for instrumenting the compiled software routine 200 in accordance with an embodiment of the present invention. Initially, at step 310, a point for augmentation 220 in the compiled software instructions 210 is selected. Subsequently, at step 320, the point for augmentation is supplemented by the event generation mechanism 230 to generate the event 240 at runtime when the execution of the compiled software routine 200 reaches the point for augmentation 220.

Figure 4:
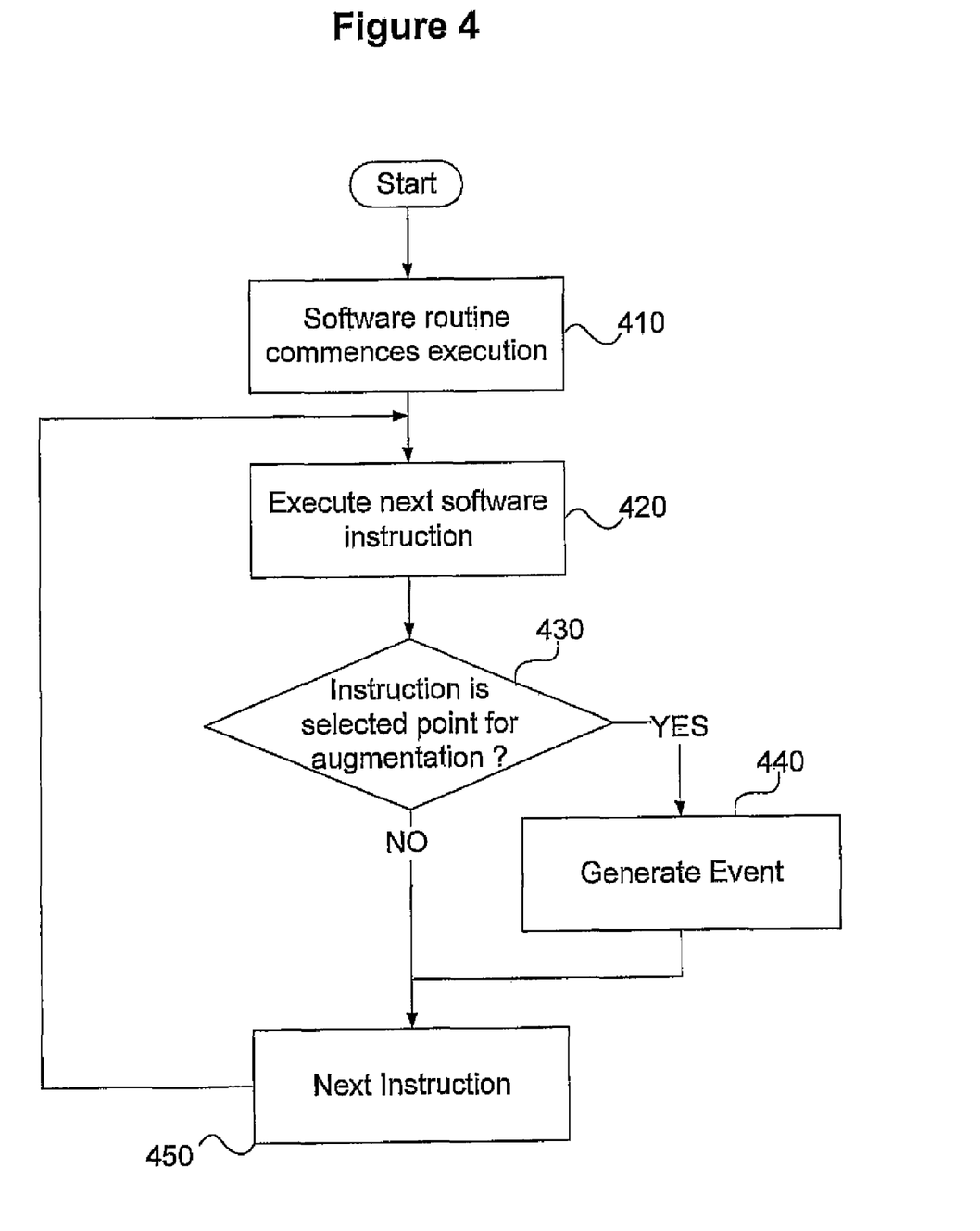
FIG. 4 is a flowchart of a method of executing the compiled software routine instrumented in accordance with the method of FIG. 3 in accordance with a preferred embodiment of the present invention.

FIG. 4 is a flowchart of a method of executing the compiled software routine 200 instrumented in accordance with the method of FIG. 3 in accordance with an embodiment of the present invention. Initially, at step 410, the software routine 200 commences execution. For example, execution of the software routine 200 involves sequential execution of each of the compiled software instructions 210 in CPU 102. Accordingly, at step 420, the method executes a next software instruction. At step 430 the method determines if the current instruction corresponds to the point for augmentation 220. The determination of step 430 can be made actively (e.g., by an event generation mechanism 230 that is monitoring the execution of the software routine 200), or passively (e.g., by an event generation mechanism 230 that inserts additional instructions into the compiled software routine 200, or by the use of a trap flag). If the point for augmentation has been reached, the method proceeds to step 440 where the event 240 is generated. Subsequently, the next instruction is processed from step 450 by iterating to step 420.

Thus, in use, the compiled software routine 200 is instrumented by the definition of a point for augmentation 220 and an event generation mechanism 230 that is operable to cause the generation of event 240 when execution of the compiled software instructions 210 reaches the point for augmentation 220. The communication of such an event to another software routine provides for the augmentation of the compiled software routine 200 by way of the other software routine. For example, additional functionality, procedures, subroutines, data manipulations, or enhancements can be provided in a software routine receiving the event.

Figure 5A:
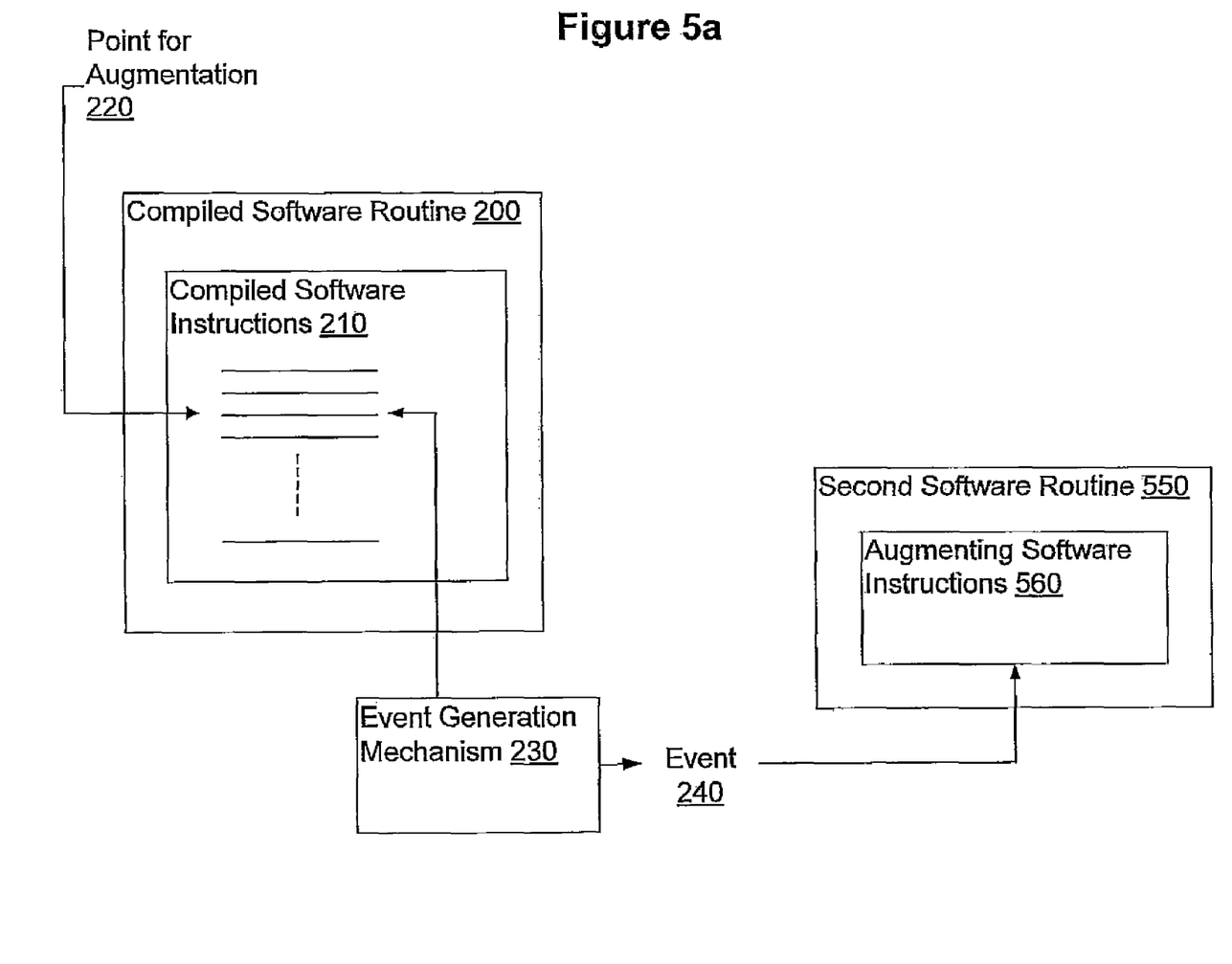
FIG. 5a is a schematic diagram of an augmented compiled software routine in accordance with a preferred embodiment of the present invention.

FIG. 5*a* is a schematic diagram of an augmented compiled software routine 200 in accordance with an embodiment of the present invention. Many of the elements of FIG. 5*a* are identical to those described above with respect to FIG. 2 and discussion of these elements will not be repeated here. FIG. 5*a* further includes a second software routine 550 comprising augmenting software instructions 560. The second software routine 550 is a software routine adapted to operate in response to the generation of event 240. For example, the second software routine 550 can receive, consume, or have communicated to it, the event 240. Alternatively, the event 240 can be a call, trigger or execution of the second software routine 550, such as a function, procedure or method call, or a jump or branch instruction. Thus, in use, the generation of event 240 by the event generation mechanism 230 serves to instigate the execution of the second software routine 550. The function of the second software routine 550 is to augment the compiled software routine 200. For example, augmentation can include providing further software instructions for providing additional functionality, procedures, subroutines, data manipulations or enhancements. Thus, second software routine 550 includes the augmenting software instructions 560 for execution on generation of the event 240 to augment the compiled software routine 200.

Figure 5B:
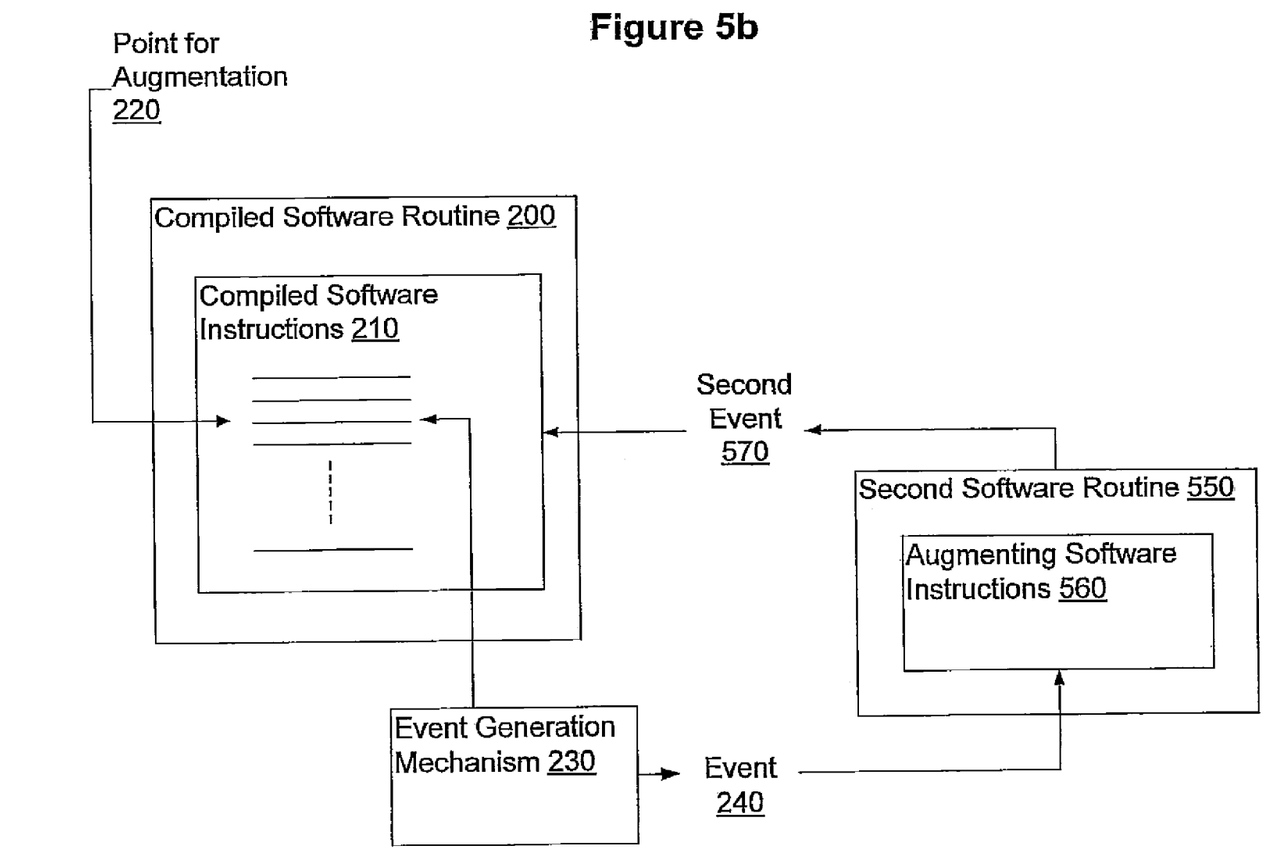
FIG. 5b is a schematic diagram of an augmented compiled software routine where the compiled software routine is suspended, in accordance with a preferred embodiment of the present invention.

In use, the compiled software routine 200 can be suspended at the point for augmentation 220 and resumed following execution of the second software routine 550 such that the second software routine 550 is able to execute synchronously with the compiled software routine 200. In this way, the execution of the compiled software routine 200 and the second software routine 550 is functionally equivalent to the execution of a single, changed software routine. FIG. 5*b* is a schematic diagram of the augmented compiled software routine 200 where the compiled software routine is suspended, in accordance with an embodiment of the present invention. The suspension of the compiled software routine 210 can be achieved using any suitable means or method, such as, for example, a software trap as described above. The execution of the compiled software routine 200 can be resumed on completion of execution of the second software routine 550 by means of a second event 570 generated by the second software routine 550 indicating that the compiled software routine 200 should resume. The second event 570 can be any suitable event such as a software message, a function return, a method return, a subroutine exit, a jump or branch.

Figure 5C:
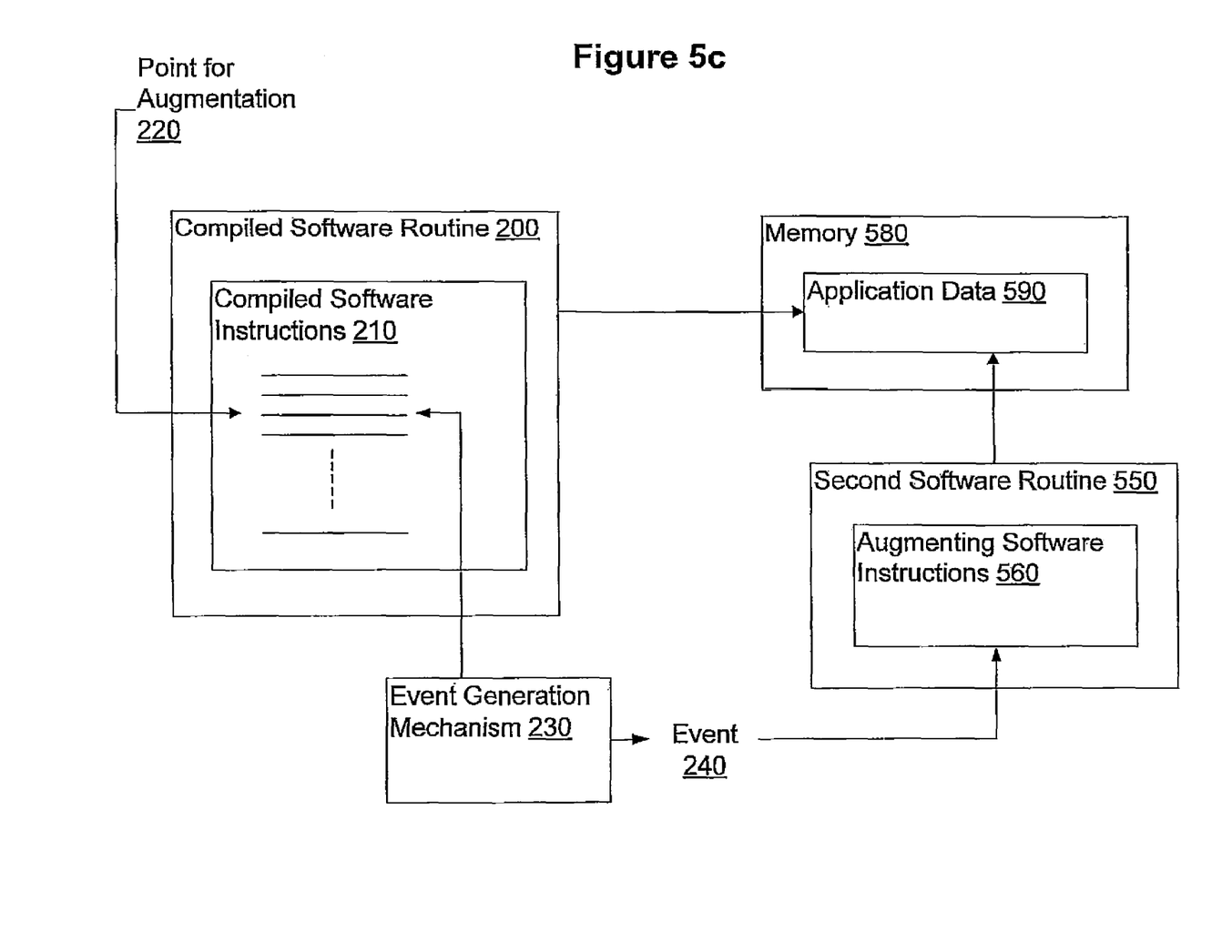
FIG. 5c is a schematic diagram of an augmented compiled software routine accessing a memory, in accordance with a preferred embodiment of the present invention.

In one embodiment, the compiled software routine 200 accesses a memory 580 for the storage of application data 590. In this embodiment, the second software routine 550 can be operable to access the memory 580 to effect changes to application data 590. FIG. 5*c* is a schematic diagram of the augmented compiled software routine 200 accessing a memory 580, in accordance with an embodiment of the present invention. For example, the second software routine 590 can modify values, formats, ranges or types of data items in application data 590 as a characteristic of the augmentation.

Figure 6:
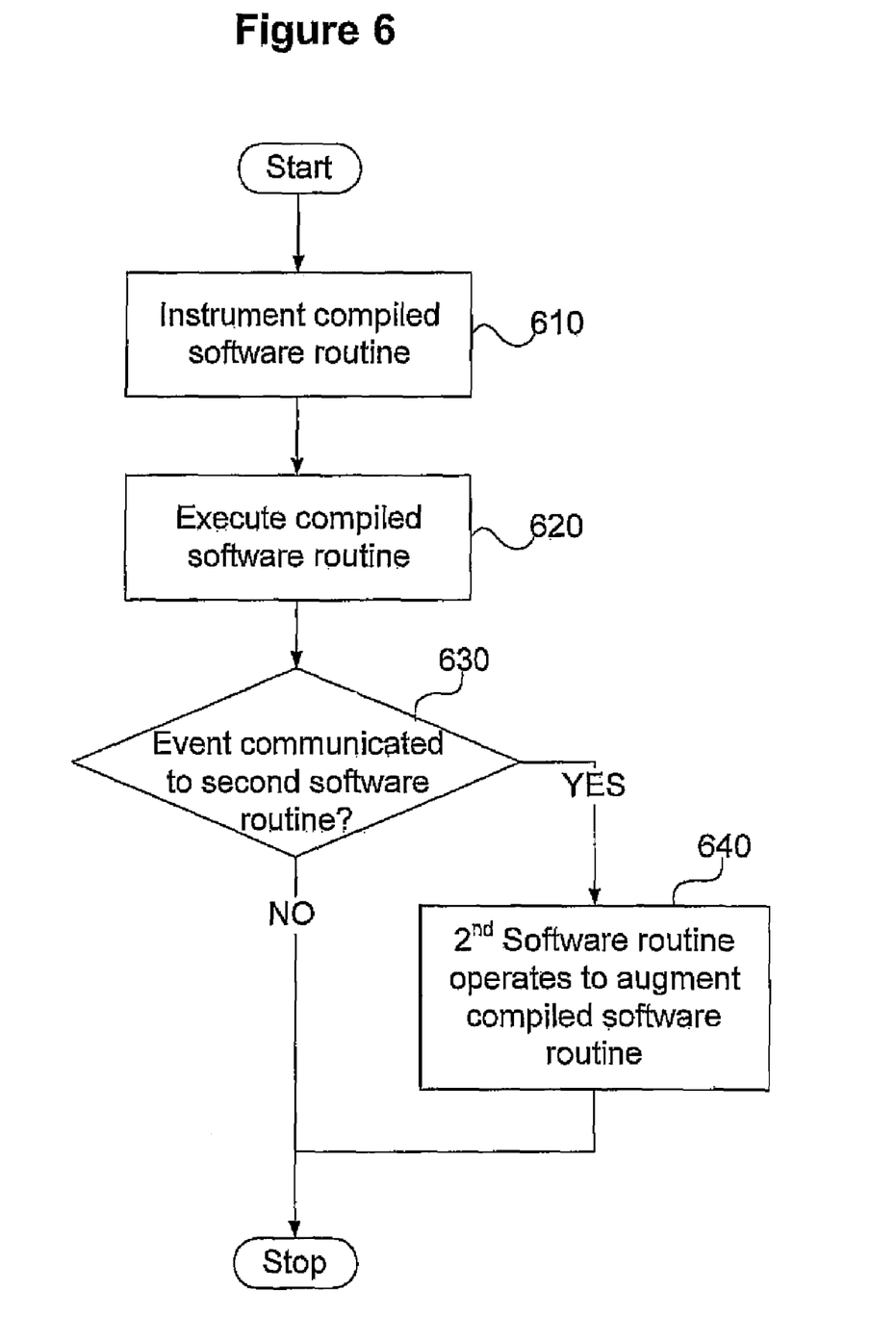
FIG. 6 is a flowchart of a method for augmenting the compiled software routine in accordance with a preferred embodiment of the present invention.

FIG. 6 is a flowchart of a method for augmenting the compiled software routine 200 in accordance with an embodiment of the present invention. Initially, at step 610, the compiled software routine 200 is instrumented using methods such as those described above with respect to FIGS. 2 and 3. Subsequently, at step 620, the method executes the compiled software routine 200. At step 630, the method determines if event 240 is generated and, if so, the second software routine executes at step 640 to augment the compiled software routine 200 by way of augmenting software instructions 560.

In this way, compiled software routine 200 is instrumented to generate the event 240 for augmentation. The compiled software routine 200 is augmented by the second software routine 550. The second software routine includes augmenting software instructions 560 for augmenting the compiled software routine, such as instructions for providing additional functionality, procedures, subroutines, data manipulations or enhancements. The augmentation can be achieved without rewriting or replacing the compiled software routine.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for augmenting a compiled software routine in execution, the compiled software routine being instrumented to generate an event at an augmentation point defined therein, the method comprising:
    storing application data generated by the compiled software routine in a memory;
    suspending execution of the compiled software routine on generation of the event;
    receiving the event at a second software routine;
    augmenting the compiled software routine by executing the software instructions included in the second software routine;
    modifying, by the second software routine, the application data generated by the compiled software routine and stored in the memory;
    generating, by the second software routine, a second event for communication to the compiled software routine; and
    resuming execution of the compiled software routine on receipt of the second event, wherein the second software routine executes synchronously with the compiled software routine.

2. The method of claim 1, wherein the software instructions for augmenting include software functionality provided in addition to that of the compiled software routine.

3. Apparatus for augmenting a compiled software routine in execution, the compiled software routine being instrumented to generate an event at an augmentation point defined therein, the apparatus performing a method comprising:
    storing application data generated by the compiled software routine in a memory;
    suspending execution of the compiled software routine on generation of the event;
    receiving the event at a second software routine;
    augmenting the compiled software routine by executing the software instructions included in the second software routine;
    modifying, by the second software routine, the application data generated by the compiled software routine and stored in the memory;
    generating, by the second software routine, a second event for communication to the compiled software routine; and
    resuming execution of the compiled software routine on receipt of the second event, wherein the second software routine executes synchronously with the compiled software routine.

4. The apparatus of claim 3, wherein the software instructions for augmenting include software functionality provided in addition to that of the compiled software routine.

5. A computer program stored on a non-transitory computer readable medium for augmenting a compiled software routine in execution, the compiled software routine being instrumented to generate an event at an augmentation point defined therein, when loaded into a computer system and executed thereon, comprising program code for:
    storing application data generated by the compiled software routine in a memory;
    suspending execution of the compiled software routine on generation of the event;
    receiving the event at a second software routine;
    augmenting the compiled software routine by executing the software instructions included in the second software routine;
    modifying, by the second software routine, the application data generated by the compiled software routine and stored in the memory;
    generating, by the second software routine, a second event for communication to the compiled software routine; and
    resuming execution of the compiled software routine on receipt of the second event, wherein the second software routine executes synchronously with the compiled software routine.

6. The computer program of claim 5, wherein the software instructions for augmenting include software functionality provided in addition to that of the compiled software routine.

* * * * *